United States Patent Office 3,705,067
Patented Dec. 5, 1972

3,705,067
METHOD OF PREPARING REINFORCED SHEETING MATERIAL BASED ON CHLORINATED OLEFIN POLYMERS
Richard B. Ammons, 11065 East Vieux,
Baton Rouge, La. 70815
No Drawing. Continuation of abandoned application Ser. No. 832,443, June 11, 1969, and a continuation-in-part of abandoned applications Ser. No. 467,081 and Ser. No. 467,096, both June 25, 1965. This application Aug. 10, 1970, Ser. No. 62,622
Int. Cl. B32b 7/04; C09j 5/00
U.S. Cl. 156—324
1 Claim

ABSTRACT OF THE DISCLOSURE

This invention is directed to flexible multicomponent laminate structures for use as flashing and the like, consisting of one or more film layers and a fabric layer wherein the film layer is prepared from a flexible essentially non-crystalline sheet of a chlorinated ethylene polymer of designated properties and wherein the fabric layer is an inherently polar woven fiber reinforcing mat.

---

This application is a continuation of Ser. No. 832,443, filed June 11, 1969, now abandoned, and a continuation-in-part of copending applications Ser. No. 467,081 filed June 25, 1965, now abandoned and 467,096 filed June 25, 1965, now abandoned.

It is standard construction practice to overcome leakage problems by using flashing in valleys between intersecting roof surfaces, over fascia boards, at joints such as those involving masonry, metal or wood (as where chimneys or vent pipes intersect a roof or where masonry parapet walls abut a roof) or between wooden and masonry members of sill structures at floors or windows, as well as in many other places where similar problems exist. The nature of the flashing employed generally varies according to the type and intended permanence of the structure. The more durable flashings heretofore employed have been sheet copper or sheet lead. Less permanent flashings can be made of galvanized iron, aluminum or a tar-impregnated "roofing paper." Recently, in quality installation, particular types of resilient plastic sheet materials have been used for the purpose.

Each of the conventional flashings has some serious recognized shortcomings. Thus, the sheet metal flashings are difficult to seal tightly, especially at joints involving wooden structural supports. Nails driven through such flashings to hold them in place establish potential leaks. These, of course, tend to become progressively worse if electrolysis occurs at the point of contact between the nail and the flashing.

There are atmospheric conditions, especially in factory districts or in coal-burning communities, which exert an accelerated corrosive effect on metal flashings. Joints in metal flashing must be made by welding or soldering. Such operations are slow and consequently expensive and, in addition, require considerable skill for proper results.

Flashings made of roofing paper are weak. As they age, they tend to develop leaks around nail holes. They also, particularly on aging, become brittle. They are, in addition, combustible.

In attempting to overcome some of the defects of prior flashing materials, some use has been made of natural rubber sheeting. While having a reasonable level of flexibility it is not long-lived, as it oxidizes and becomes brittle and weak in the course of a very few years. In addition, use has been made of sheeting prepared from synthetic rubber, e.g. butyl rubber sheeting. This type of sheeting, however, requires vulcanization for fabrication, is generally incapable of being joined into larger sheets in the absence of adhesives and is difficultly formulated to provide flame-resistant materials.

Particular types of plasticized, resilient, synthetic thermoplastic sheets formed from vinylidene chloride interpolymers have, despite their comparatively recent origin, been used as flashing with considerable satisfaction and success. Although these prior types of flashing made from synthetic resins give very good service when installed in fairly mild climates, a tendency to stiffen is frequently encountered when such materials are installed in areas where extremes in temperatures and/or humidity exist. This loss of flexibility is due at least in part to a gradual volatilization or release of the plasticizing component from the flashing composition. Similar problems are also encountered when using flashing based on plasticized polyvinyl chloride resins. Further, prior known thermoplastic sheeting suffers from a lack of dimensional stability resulting from excessive shrinkage when exposed to elevated temperatures, as encountered during exposure to the sun, for extended periods of time, as well as a loss in tensile properties when exposed to conditions of fabrication and/or use.

Many of these same disadvantages of prior known sheeting are apparent when such materials are used as membranes to cover entire roofs, or to act as water and water vapor barriers under concrete slabs and/or when placed adjacent to sub-surface walls, etc.

Accordingly, it is the principal object of this invention to provide a long-lived, inherently resilient dimensionally stable and non-combustible flashing or membrane for use in construction, which material additionally is: corrosion resistant, easily sealed to other sheets of like material by conventional solvent welding and/or dielectric, ultrasonic, or resistance welding techniques, capable of forming a tight seal around nails or other fastening devices driven through it, is not damaged or significantly deformed when subjected to temporary localized stress, and which is compatible with conventional roofing materials such as pitch and asphalt.

Another object is to provide such a flashing or membrane material which does not require the addition or presence of elasticizing ingredients and which retains substantially its original flexibility and dimensional stability under a wide variation of climatic and environmental conditions over extended periods of time.

A related object is the provision of improved composite structures comprising the new flashing and membrane material.

Other and related objects and advantages will become evident from the following specification and claim.

The flashing or membrane of the present invention is a laminate structure consisting of (1) One or more film layers comprised of an essentially non-plasticized thermoplastic sheet of solid chlorinated olefin polymer, which polymer is preferably prepared by the chlorination, in suspension in an inert diluent, of polyethylene or interpolymers containing at least about 90 mole percent of ethylene in the polymer molecule with any remainder being one or more ethylenically unsaturated comonomers, wherein such polymers are of an essentially linear structure and have a molecular weight less than about 1,000,000 and preferably from about 20,000 to 300,00. Such chlorinated olefin polymers contain from about 25 to 50 weight percent of chemically combined chlorine and are further characterized having a relative crystallinity of between about 15 and 28 percent when containing about 25 weight percent chlorine and a relative crystallinity of less than about 10 percent when containing about 34 or more weight percent of chlorine; said sheet having a thickness of from about 0.005 to 0.25 of an inch, a tensile strength of at least about 1100 pounds per square inch, an elongation of between about 350 and 900 percent and a 100 percent modulus of between about 150 and 1500 pounds per square inch; and (2) An inherently polar woven reinforcing fiber mat applied in essentially co-extensive lamination with at least one major surface of the chlorinated olefin polymer sheet or sheets.

The chlorinated polyolefins employed in the flashing compositions of the present invention can be readily obtained by practice of a chlorination procedure which comprehends the suspension chlorination in an inert medium of polymers and interpolymers of ethylene, as hereinafter more fully defined, to a desired total of combined chlorine, wherein such polyolefin is first chlorinated at a temperature of up to about 110° C., and preferably between about 65° C. and 110° C. for a period sufficient to provide a chlorine content of not more than about 23 weight percent chlorine, based on the total weight of the polymer; followed by the sequential suspension chlorination of such polymer, in a substantially non-crystalline, particulate form, at a temperature above that employed for the herein described first chlorination and not more than about 150° C.

Preferably, the polyolefinic materials to be chlorinated are those distinct species and varieties of essentially linear and unbranched highly porous, finely divided polymers containing at least about 90 mole percent ethylene in the polymer molecule with the remainder being one or more ethylenically unsaturated comonomers. Exemplary of such comonomers are the non-aromatic hydrocarbon olefins having 3 or more carbon atoms such as propylene, butene-1 and butene-2, and 1,7-octadiene and the like; cycloaliphatic olefins such as 1,5-cyclopentene and cyclooctadiene and the like; substituted olefins such as acrylic acid and its esters; conjugated diolefins such as butadiene and the like; and the alkenyl aromatic compounds such as styrene and its derivatives, among many other polymerizable materials known to the art.

Advantageously, the polymers and interpolymers described herein, are prepared under the influence of catalyst systems comprising admixtures of strong reducing agents such as triethyl aluminum and compounds of groups IV-B, V-B and VI-B metals of the Periodic System, such as titanium tetrachloride, and the like, and are characterized by having molecular weights ranging generally less than about 1,000,000 and preferably between about 20,000 and 300,000.

The liquid which is employed to suspend the finely divided polymer may be any liquid which is inert to the polymer and is not affected to an appreciable extent by chlorine, or which, while wetting the polymer will not have an appreciable solvent effect on it. While water may be employed with especial advantage as suspending liquid for the poleolefins to be chlorinated, the polymers may also be suspended in other inert liquids.

A variety of wetting agents, including sulfonates, sulfates, polyphosphates and other types of ionic and anionic surfactant materials may be suitably employed, if desired to assist the inert suspending liquid (particularly when such liquid is water) to wet the polymer. Such materials as sodium lauryl sulfate and the alkyl aryl polyether alcohols are illustrative of specific wetting agents that may be utilized. The employment of a wetting agent facilitates the mechanical handling of the suspended polymer during the suspension chlorination. In some cases, however, it may not be necessary to employ wetting agents, especially when a freshly prepared polymer is employed that is undried after its preparation or when efficient agitation is available for producing and maintaining the polymer slurry.

Further, if it is desired to accelerate the chlorination rate the reaction may be assisted by the employment of small quantities of catalysts, such as the free-radical types and/or ultra-violet light. When a free-radical catalyst is employed, the rate of reaction which is accomplished through the assistance of the catalyst will depend on such factors as the catalyst concentration, the temperature of the suspending medium in which the catalyst is dissolved, the pH of the solution and the chlorine pressure. Various azo type compounds and peroxides selected from the group of free-radical catalysts consisting of diacetyl peroxide; peracetic acid; hydrogen peroxide; tertiary butyl peroxide; tertiary butyl hydroperoxide; potassium persulfate; diazodiisobutyronitrile; methyl ethyl ketone peroxide and the like may advantageously be employed. Preferably, when catalysts are employed, such catalyst should be one which has an efficient rate of decomposition in the suspending medium in which it is dissolved, in the required temperature range. In this regard it may be advantageous to employ a mixture of such catalysts, one of which has a temperature of efficient decomposition at or near the optimum initial chlorination temperature, and the other having an efficient decomposition at or near the optimum sequential chlorination temperature. Such catalysts may be added in a single step or continuously depending upon the reaction conditions and catalyst used.

The suspension chlorination procedure described herein as a preferred chlorination technique may be carried out at atmospheric pressure; however, best results are generally obtained wherein superatmospheric pressures are employed. Such chlorination pressure is not critical except as necessary to obtain an efficient rate of reaction. In this regard, it is pointed out that for a given catalyst or admixture thereof, at a given concentration in the suspending medium, the reaction rate is conveniently controlled by the rate of feed of chlorine and/or its partial pressure in the reaction vessel.

After the polyolefinic material has been suspension chlorinated to a desired degree, it may be easily separated from the inert suspending liquid by conventional means and washed and dried to prepare it for subsequent use.

The entire chlorination procedure or any desired part of it may be carried out batchwise or by continuous processing arrangements. For batch operations it is ordinarily suitable to employ conventional autoclaves and kettles or the like for conducting the reaction. However, it may also be conveniently conducted in a continuous process by any one of several suitable techniques. For example, it may be conducted by counter-current movement of the reactants through either horizontally or vertically disposed reactors which may be in the form of tubes and towers, or by using a cascading principle with a series of interconnected reaction chambers.

Substantially quantitative yields, based on the weight of the polymer to be chlorinated, may be frequently obtained by the chlorinating technique described herein. The attainment of such yields, as has been indicated, may often be facilitated by the practice of recycling techniques for unreacted portions of the chlorine and by conducting the involved reactions at more moderate rates.

It is furthermore possible and has proved of special advantage to carry out the chlorination in the presence of essentially chemically inert substances of inorganic or organic chemical nature which are such that they can be retained in the final product. Exemplary of such materials are: carbon black, titanium dioxide, magnesium silicate, and the like as well as organic plastic materials such as polyvinyl chloride and the like. Such materials may be employed for the desired purpose without significantly detracting from the highly desirable elastomeric properties of the chlorinated polymer. The addition of such fillers serve to inhibit excessive particle growth during chlorination, which agglomeration is undesirable in later manufacturing and fabrication steps. It is to be noted however, that such materials may also be post-blended with the chlorinated product as one method of obtaining the most desirable values of the various physical properties.

It is to be understood, that the herein described chlorination procedures may be varied depending upon the particular polyolefins being halogenated, upon the types and amounts of wetting agents being employed, and with other factors. In any case, it is imperative that the flashing or membrane material of the present invention is characterized by the highly desirable, and heretofore unobtainable, combination of properties as previously specifically set forth herein.

Other suitable materials which may be blended with the chlorinated olefin polymer include both the pigment fillers and fibrous fillers. Examples of pigment fillers are the clays, calcium sulfate, and mica among others including coarse fillers such as pulverized marble or limestone, if desired. Suitable fibrous fillers include asbestos, cork, wood, flour, etc.

Stabilizers are included in the compositions to protect the chlorinated olefin polymer against decomposition by the heat of processing or by subsequent exposure of the fabricated sheet material to climatic and environmental conditions of use. Suitable stabilizers include those materials conventionally employed in the preparation of vinyl polymer and copolymer sheet compositions, e.g., organic complexes and/or salts of lead, tin, barium, cadmium, zinc, sodium, etc., and particularly the barium-cadmium soaps as well as dibutyl tin laurate and dibutyl tin maleate, among others. Stabilizers are preferably used in amounts between about 1 and 5 parts by weight per 100 parts of the chlorinated olefin polymer constituent. Other conventional additives, such as epoxidized and non-epoxidized oils may be used. Low molecular weight polymers and waxes may also be employed, if desired, in amounts of up to about 15 parts per 100 parts of chlorinated olefin polymer.

Although the chlorinated olefin polymers employed for the purposes of the present invention are inherently resistant to burning, it may in some instances be advantageous to incorporate minor amounts, i.e., from between about 1 and 10 parts per hundred parts of chlorinated olefin polymer, of one or more flame-retarding agents, e.g., oxides of antimony and/or various halogenated materials such as tetrabromophthalic anhydride, perchloropentacyclodecane, tris(2,3 - dibromopropyl)phosphate, tetrabromobisphenol-A, among many others.

It is generally unnecessary to add conventionally employed plasticizers to the compositions from which the sheet-like materials of the present invention are formed, however, those materials as conventionally employed for vinyl polymers may be used in concentrations less than about 10 percent as processing aids if desired.

The sheet-like materials of the present invention may be prepared by conventional techniques wherein the chlorinated olefin polymer is prepared as described herein and blended with the desired fillers and stabilizers, etc., substantially in the manner conventionally employed in preparing vinyl chloride polymer and copolymer sheeting compositions. Thus, for example, the necessary ingredients may be initially dry blended in a mixer such as a ribbon blender and subsequently milled as on a two-roll compounding mill at roll temperatures between about 240° F. and 400° F. until the mixture becomes homogeneous. The blend may then be extruded into sheet form or calendered to give the desired sheet thickness. In general, sheet-like structure having a thickness of between about 0.005 and 0.25 of an inch and preferably between about 0.020 and 0.1 of an inch are utilized as flashings and/or membranes in construction assemblies.

It is to be noted that the present invention contemplates utilization of such sheet-like structures in both a substantially unvulcanized or vulcanized form.

It has further been discovered that lamination of an inherently polar, woven fiber reinforcing mat, such as mats prepared from woven polyethylene terephthalate or nylon fibers to at least one major surface of the preformed chlorinated olefin polymer sheet, i.e. to form a two component laminate structure or a three component laminate structure wherein the fabric layer is placed between two film layers by application of heat and pressure, provides unexpectedly good dimensional stability and enhanced tensile strength retention during fabrication and/or use of the sheet as flashing stock or as a continuous membrane material. The utilization of such reinforcement is particularly advantageous for preventing shrinking and/or undesirable distortion of the chlorinated olefin sheet when such sheet is subjected to localized stress and/or to elevated temperatures for extended periods of time.

Exemplary of particularly preferred polar woven fiber reinforcing mats are the polyester fibers or nylon fibers having a denier of less than about 200 and wherein each fiber has a diameter of less than about 0.005 of an inch.

By the expression "polyester fiber" as used herein is meant any manufactured fiber in which the fiber-forming substance is any long chain synthetic polymer composed of at least 85 percent by weight of an ester of a dihydric alcohol and terephthalic acid, as defined by the Textile Fiber Product Identification Act of 1960.

By the expression "nylon fiber" as used herein is meant any manufactured fiber in which the fiber-forming substance is any long chain synthetic polyamide having a recurring amide group

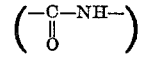

as an integral part of the polymer chain as defined by the Textile Fiber Product Identification Act of 1960.

The polar woven fiber mat reinforcement is applied to one or both major surfaces of the thermoplastic sheet by any conventional technique utilizing pressure adequate to form a composite laminated structure. It is generally advantageous, however, to apply such reinforcement by passing the reinforcing mat and the thermoplastic sheet in overlying relationship between the nip of two or more laminating rolls while utilizing a pressure sufficient to provide adequate lamination, without destroying the construction of the reinforcing material.

In order that those skilled in the art may better understand how the composite structures in accordance with the present invention may be prepared, the following examples are given by way of illustration and not by way of limitation. All parts and percentages in the examples are by weight.

EXAMPLE I (1) Preparation of chlorinated polyethylene sheet material.—To 4000 parts by weight of deionized water was added, with stirring, 200 parts by weight of a polyethylene having an essentially linear unbranched structure (containing less than about 1 methyl group per 100 methylene units), and having a melt index of about 1 and a molecular weight of about 60,000. Such polyethylene had been previously prepared by a process using a catalyst composed of triisobutyl aluminum and titanium tetrachloride. The resulting admixture was then charged to an autoclave with 8 parts by weight of calcium chloride; about 0.5 part by weight of a 70 percent solution of ditertiary butyl peroxide in butanol; and about 0.5 parts by weight of a commercially available wetting agent.

The charge was then chlorinated, in a first chlorination step, under about 30 p.s.i. (gauge) of chlorine pressure at a temperature of about 90° C. until a chlorine content of about 20 percent was obtained. The charge was then chlorinated in a second suspension chlorination step, at a temperature of about 126° C. until a total chlorine content of about 42 percent was obtained. The chlorination product was then isolated from the dispersion by filtration, washed free of residual hydrochloric acid and dried.

The dried material was then used to prepare the following formulation by dry-blending of the designated materials in a ribbon blender.

Material: Parts by weight
- Chlorinated polyethylene _____ 100
- Liquid barium-cadmium heat stabilizer _____ 4
- Phosphite stabilizer _____ 0.5
- Epoxidized oil _____ 3.0
- Antimony oxide _____ 1.0
- Chlorinated wax _____ 2.0
- Talc _____ 10
- Carbon black (average particle size of between 15 and 20 millimicrons) _____ 2.5
- Stearic acid _____ 2

The above dry blend was then conveyed into the feed hopper of a two-stage vacuum vented single screw extruder. The first stage was operated at about 375–400° F. and the second stage at 325–400° F. The vacuum was about 26 inches of mercury. The melt was then extruded through a sheet die to form a sheet having a thickness of about 0.06 of an inch.

The following illustrates various physical properties inherent in the sheet material:

ASTM D 882–61T
- Ult. tensile strength _____ p.s.i__ 1700–2000
- Ult. elongation _____ percent__ 600–800
- 100% modulus (tensile stress @100% elongation) _____ p.s.i__ 200

(2) Lamination of chlorinated polyethylene sheet to reinforcing materials.—In each of a series of experiments, individual samples of the chlorinated polyethylene sheet of (1) were separately laminated along one major surface thereof to one of a series of reinforcing materials by passage of such sheet and reinforcing material through the nip of laminating rolls operating at a temperature of about 220° F. to form individual laminate structures.

(3) Testing of the laminate structures.—The tensile strength in p.s.i. of each of the laminate structures was determined utilizing the procedures of ASTM Test No. D–412–62T.

(4) Sample identification and testing results are shown in Table I.

EXAMPLE II (1) In each of a series of additional experiments, individual samples of the chlorinated polyethylene sheet of (1) of Example I were separately laminated along one major surface thereof to one of a series of reinforcing materials by passage of such sheet and reinforcing material through the nip of laminating rolls operating at a temperature of about 220° F. to form individual laminate structures and tested as per (3) of Example I.

(2) Sample identification and testing results are shown in Table II.

The data of Tables I and II illustrate the differences in tensile strength and resistance to delamination of the composite laminate structures of the present invention as contrasted to laminates of the specified chlorinated polyethylene sheet with conventional non-woven glass fiber mesh or woven glass fiber mat reinforcing materials, wherein all laminates are prepared in the absence of strength inducing impregnating resin materials.

The composite materials of the present invention are further characterized by being inherently flexible under widely differing climatic and environmental conditions, are resistant to burning, are capable of being easily welded to each other by application of conventional solvents such as methyl ethyl ketone, toluene, xylene and the like, and are susceptible to adhesion with conventionally employed adhesives.

Further, by way of comparison, it has been found that utilization of chlorinated olefin polymers having molecular weights exceeding 1 million are generally incapable of being fabricated into sheet-like structures without the addition of significant amounts of plasticizers or other processing aids. By way of illustration, it has been found that the non-plasticized chlorinated polyolefins as described in Examples I and II can be extruded through a standard Instron rheometer orifice, using a 190° C. barrel temperature, at a 150 sec.$^{-1}$ shear rate with a resultant shear stress of from 25–35 p.s.i., whereas under the same conditions chlorinated polyethylenes having a molecular weight of from 1 million to 5 million are characterized by a shear stress of greater than about 85 p.s.i. and often cannot be made to pass through the orifice of the rheometer.

Still further, it has been found that utilization of chlorinated polyolefins as herein described, but having a chlorine content of greater than about 50 weight percent provides sheet material having reduced resistance to heat. Also, chlorinated polyolefins, as herein described, but having a chlorine content of less than about 25 weight percent are characterized by reduced solvent weldability properties and are less resistant to burning.

It is further to be noted that the present invention contemplates the utilization of a chlorinated polyolefin where-

TABLE I

| | CPE sheet | | Laminate description | | Tensile strength of laminate (p.s.i.) |
|---|---|---|---|---|---|
| | | | Backing | | |
| Sample number | Percent Cl | Thickness (inches) | Types | Thickness (inches) | |
| The invention, 1 | 42 | 0.06 | Woven polyethylene terephthalate fiber mat of denier less than about 200 and where each fiber has a diameter of less than about 0.005." | 0.005 | 500 |
| For comparison: | | | | | |
| 2 | 42 | 0.06 | None | | 65 |
| 3 | 42 | 0.06 | Non-woven glass fibers (3/16" mesh) | 0.01 | (1) |
| 4 | 42 | 0.06 | Non-woven glass fibers (1/8" mesh) | 0.01 | (1) |
| 5 | 42 | 0.06 | Non-woven glass fibers (1/4" mesh) | 0.01 | (1) |
| 6 | 42 | 0.06 | Woven glass fiber mat (3/16" mesh) | 0.01 | (1) |

[1] Delaminated.

TABLE II

| | CPE sheet | | Laminate description | | Tensile strength of laminate (p.s.i.) |
|---|---|---|---|---|---|
| | | | Backing | | |
| Sample number | Percent Cl | Thickness (inches) | Types | Thickness (inches) | |
| The invention 7 | 42 | 0.06 | Woven nylon mat having a denier of less than about 200 and where each fiber has a diameter of less than about 0.005". | 0.005 | 500 |
| For comparison: | | | | | |
| 8 | 42 | 0.06 | None | | 65 |
| 9 | 42 | 0.06 | Non-woven glass fibers (3/16" mesh) | 0.01 | (1) |
| 10 | 42 | 0.06 | Non-woven glass fibers (1/8" mesh) | 0.01 | (1) |
| 11 | 42 | 0.06 | Non-woven glass fibers (1/4" mesh) | 0.01 | (1) |
| 12 | 42 | 0.06 | Woven glass fiber mat (3/16" mesh) | 0.01 | (1) |

[1] Delaminated.

in the chlorination is accomplished in suspension in an inert liquid. Such chlorination technique eliminates the difficulties inherent in the solution chlorination of polyolefins. In addition, such chlorination technique provides a chlorinated product characterized by the major portion of the polymer chain being chlorinated in a random manner characteristic of that obtained by solution chlorination technique, and only minor portions of the polymer chain being chlorinated in a block fashion. Thus, the chlorination product described herein might accurately be termed a "hybrid" since it possesses the desirable qualities of products prepared in ordinary suspension and ordinary solution chlorination methods, while eliminating some of the undesirable characteristics inherent in both such prior known procedures and products.

What is claimed is:

1. A process for enhancing the dimensional stability of a preformed inherently flexible, essentially non-crystalline sheet of a chlorinated ethylene polymer having from 25 to 50 weight percent of chemically combined chlorine wherein the major portion of the polymer chain is chlorinated in a random manner characteristic of that obtained by solution chlorination and wherein only a minor portion of the polymer chain is chlorinated in a block fashion which process consists of applying a woven fiber reinforcing mat having a polar attraction for said sheet of chlorinated ethylene polymer said mat being selected from the group consisting of nylon fiber and polyethylene terephthalate fiber of denier less than about 200 wherein each fiber has a diameter of less than about 0.005 of an inch, in co-extensive heat and pressure lamination with at least one major surface of said sheet, by passing said sheet and said fiber reinforcing mat through the nip of laminating rolls wherein said rolls are maintained at a temperature not exceeding about 220° F. and wherein said sheet of chlorinated ethylene polymer remains in a substantially non-melted form during said pressure lamination.

References Cited
UNITED STATES PATENTS

| | | | |
|---|---|---|---|
| 2,994,940 | 8/1961 | Ferrell et al. | 161—92 X |
| 2,913,449 | 11/1959 | Hoerger et al. | 260—94.9 |
| 3,222,237 | 12/1965 | McKelvy | 161—92 X |
| 3,282,910 | 11/1966 | Klug et al. | 260—94.9 |
| 3,244,774 | 4/1966 | Kaupp et al. | 260—897 |
| 2,994,940 | 8/1961 | Ferrell et al. | 161—94 X |
| 2,913,449 | 11/1959 | Hoerger et al. | 260—94.9 |
| 2,625,499 | 1/1953 | Nebesar | 161—189 X |

ROBERT F. BURNETT, Primary Examiner

J. C. GIL, Assistant Examiner

U.S. Cl. X.R.

156—1; 161—92, 227, 231, 247, 256; 260—94.9 H